Oct. 3, 1933.　　　　A. L. NELSON　　　　1,928,842
PISTON
Filed May 9, 1929　　　2 Sheets-Sheet 1
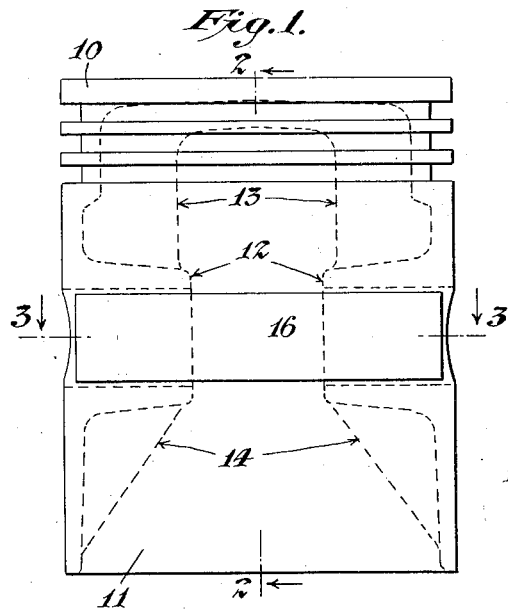
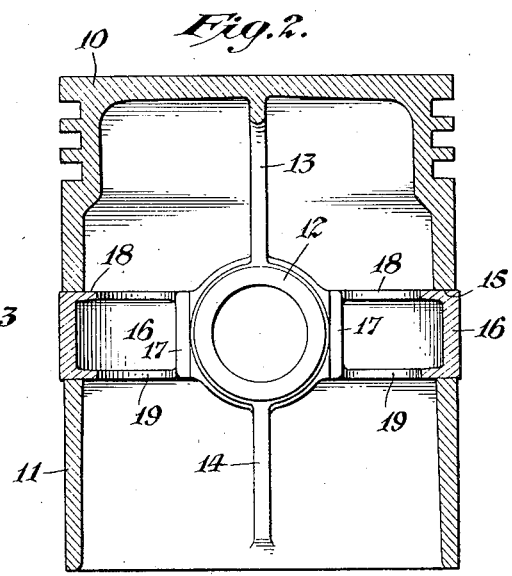
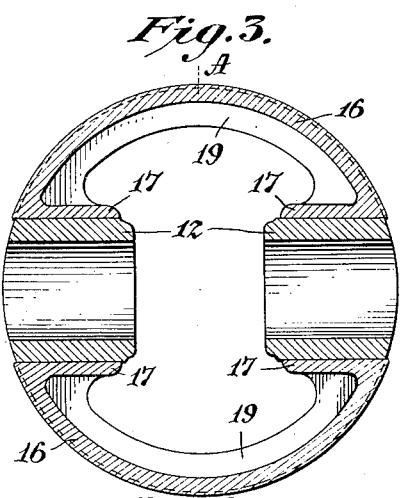
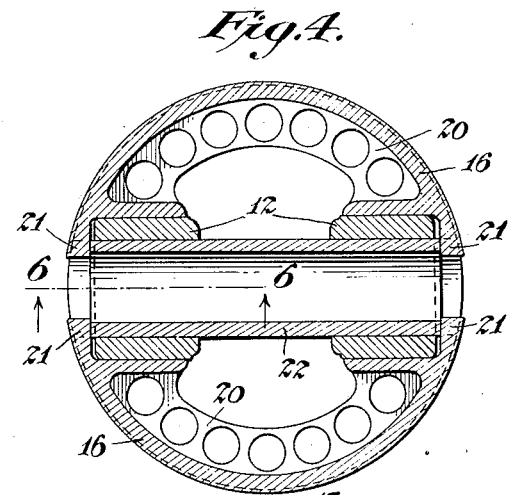
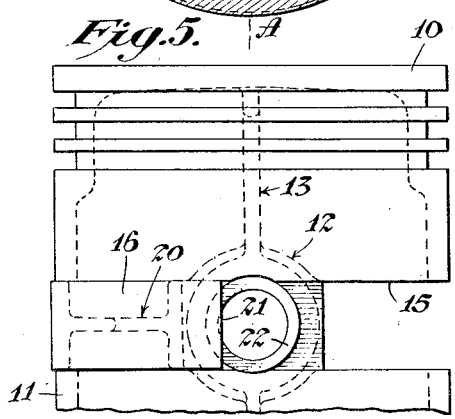
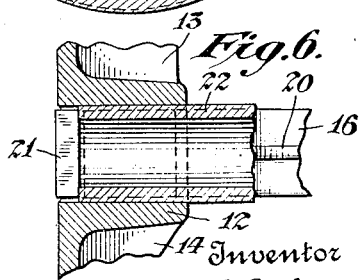

Oct. 3, 1933.  A. L. NELSON  1,928,842

PISTON

Filed May 9, 1929  2 Sheets-Sheet 2

Inventor
Adolph L. Nelson,
By his Attorney
Frank J. Kent.

Patented Oct. 3, 1933

1,928,842

UNITED STATES PATENT OFFICE 1,928,842

PISTON

Adolph L. Nelson, Detroit, Mich.

Application May 9, 1929. Serial No. 361,643

1 Claim. (Cl. 309—10)

This invention relates to pistons for internal combustion engines, particularly to such engines for use in motor vehicles.

A particular object of the invention, is to provide a means for fitting a light-weight piston in a cylinder made of cast iron or other suitable material in a manner to prevent piston slap when the parts are cold.

This object is accomplished by providing two shoes formed of material that has a lower coefficient of thermal expansion than the material of the piston, the shoes being set into the thrust faces of the piston but projecting slightly beyond the circumference of the piston when the parts are cold. It is thus possible to give the piston the necessary clearance in the cylinder when cold but to fit the shoes closely to the cylinder to prevent slap.

An additional feature of the invention resides in forming each of the shoes with projections that extend over the ends of the piston pin and act to retain the pin in place.

A further point of novelty resides in forming angularly disposed surfaces on the shoes co-operating with similarly arranged surfaces on the piston, the parts being so arranged that the angular faces of the piston permit the shoes to remain closer together than would be possible without these angular faces.

While preferred forms of the invention have been disclosed for purposes of illustration, it should be understood that various changes may be made in the structure without departing from the spirit and scope of the invention as hereinafter set forth and claimed.

In the drawings·

Fig. 1 is a side elevation of a piston embodying the present invention.

Fig. 2 is a vertical section through the piston of Fig. 1.

Fig. 3 is a section on line 3—3 of Fig. 1.

Fig. 4 is a section similar to Fig. 3 but showing a modification.

Fig. 5 is a fragmentary side elevation of the piston of Fig. 4.

Fig. 6 is a section on line 6—6 of Fig. 4.

Figure 7:
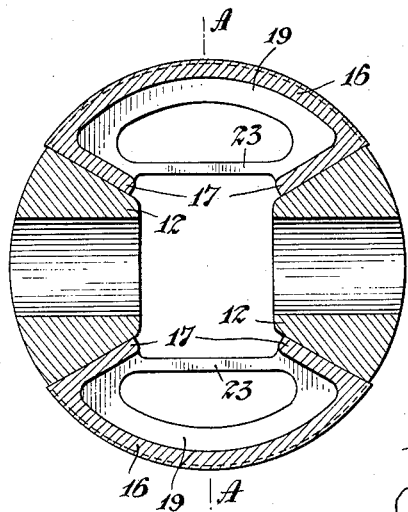
Fig. 7 is a section similar to Fig. 3 but illustrating a still further modification of the invention.

Referring to the drawings more particularly, the piston comprises a head 10 and a skirt 11. Piston pin bosses 12 extend inwardly from the skirt wall on opposite sides of the piston, and a radial reinforcing rib 13 connects each pin boss with the head. A radial rib 14 extends downwardly from each pin boss to the lower end of the skirt.

The piston is preferably formed of some lightweight material, such as an alloy of aluminum, and due to the relatively high rate of thermal expansion of such light-weight materials, it is necessary to give the skirt a relatively loose fit in the cast iron engine cylinder when the parts are cold. Under these conditions the pistons would slap when cold unless some means is used to prevent the slap, and the present invention provides construction for this purpose.

This construction includes forming a horizontal opening 15 in the wall of the skirt on each side of the piston, each opening extending from one pin boss to the other, and fitting a shoe 16 into each of the openings 15.

The shoes 16 illustrated in Figs. 1, 2 and 3 are of arcuate formation and carry at each end a foot 17 adapted to fit against a finished part of the pin boss. Flanges 18 and 19 extend inwardly from the upper and lower edges of the shoes for purposes of reinforcement to make the shoes rigid. These shoes 16 may be made of any suitable material having good wearing qualities and a lower coefficient of thermal expansion than the material of the piston. For example, the shoes may be formed of cast iron, or may be stamped or forged from ordinary steel or from invar, or other high nickel steels.

The parts are so proportioned that when the piston is cold the shoes extend somewhat beyond the normal diameter of the skirt, as shown on an exaggerated scale in Figs. 2 and 3, and have a relatively close fit with the walls of the cylinder in which the piston is to operate.

As the piston warms up in operation the aluminum parts of the piston skirt expand at a rate determined by the coefficient of expansion of the skirt material, but the shoes expand more slowly. Thus, considering the diameter A—A of Fig. 3, the expansion that takes place between the outer peripheries of the two shoes will be a composite of the rate of expansion of the skirt material and the rate of expansion of the material of the shoes. For the distance between the two shoes the aluminum alloy of the pin bosses operates to separate the shoes, but for the remainder of the diameter, the expansion rate is that of the material of the shoes.

It is apparent that with the structure disclosed in Figs. 1 to 3 the rate of expansion on the diameter A—A will be less than the rate of expansion of the aluminum alloy of the skirt, and that the exact rate of expansion on diameter A—A will depend partly on the rate of expansion of the material of the shoes. In designing a piston of this type it is possible to give the piston any desired rate of expansion on the diameter A—A by a proper selection of material for the shoes and a proper proportioning of the amounts of the different materials that affect the rate of expansion on that diameter.

The shoes 16 can be reinforced and stiffened in any suitable manner, as by the central perforated rib 20 shown in Figs. 4, 5 and 6. These figures also show that the ends of the shoes may be formed with projections 21 that extend over the ends of the piston pin 22 and retain the piston pin in position.

A further modification of the arrangement is shown in Fig. 7. Here the supporting surfaces of the feet 17 are formed on angles converging toward the center of the piston, and the cooperating surfaces of the pin bosses are disposed on similar angles. With this construction the total expansion on the diameter A—A will be diminished by the fact that as the piston expands the pin bosses 12 are carried apart, permitting the shoes to ride down on the sloped surfaces of the pin bosses, which means that the shoes come nearer together along diameter A—A than they would be if the inclines were not present.

Figure 8:
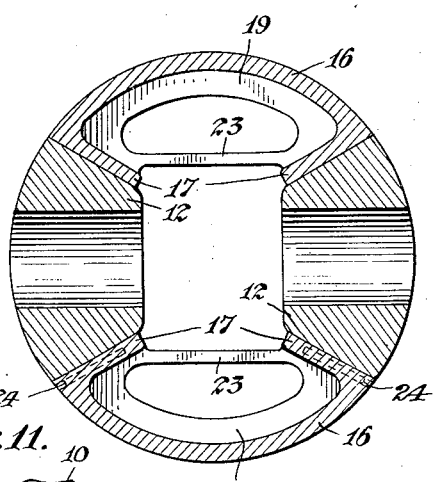
Fig. 8 is a section showing the parts of Fig. 7 after a rise in temperature.
Figure 11:
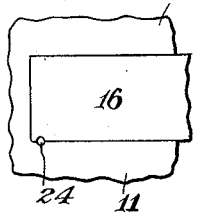
Fig. 11 is a side elevation of a part of the piston of Fig. 8.

Fig. 7 shows the parts when cold, with the shoes 16 projecting beyond the periphery of the piston skirt. Fig. 8 shows the parts after they have been heated to the point where the shoes no longer extend beyond the skirt.

Figs. 7 and 8 also show that a tie 23 may form a direct brace between the feet 17 of each shoe.

By varying the angle of the feet 17 it is possible to change the effect of these angles on the diameter A—A. For example Fig. 9 shows an arrangement in which the angles are flatter and will therefore have less effect in reducing the expansion on diameter A—A.

Figure 10:
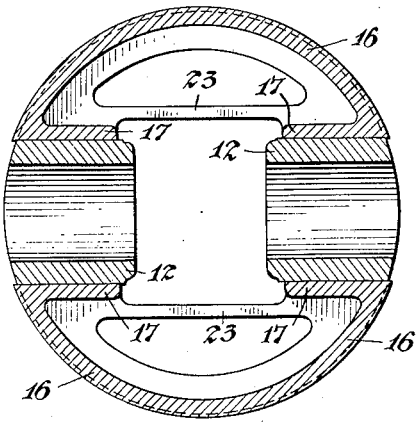
Fig. 10 is a view similar to Fig. 3 but showing a further modification of structure.

Fig. 10 shows that the tie 23 may be used on the shoe regardless of the presence of other features of the invention. This figure shows the tie applied to the construction of Fig. 3.

The shoes may be arranged so that they are freely separable from the piston, or means may be provided for holding the shoes in place. Such an arrangement is shown in Figs 8 and 9, where angularly arranged pins 24 hold the shoes in assembled position on the piston.

Figure 9:
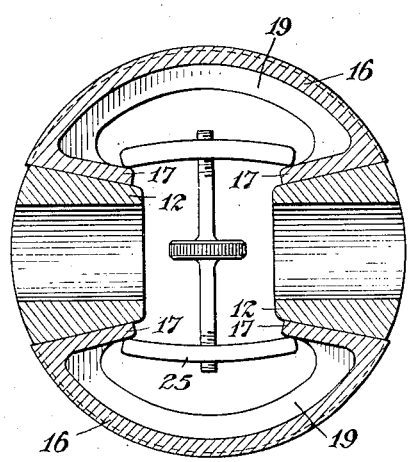
Fig. 9 is a view similar to Fig. 7 but showing a somewhat different arrangement of the parts.

It may be advantageous in certain cases to use a temporary clamp such as that illustrated at 25 in Fig. 9 to hold the shoes in place while the piston is being finished. This clamp is removed before the piston is assembled in a motor.

I claim:

A piston including a skirt and pin bosses formed of light-weight material, thrust faces formed on the skirt, each of the thrust faces being formed with an aperture in the circumferential zone of the pin bosses, each pin boss being formed with an inwardly sloped wall facing each aperture, and a rigid shoe of material less expansible than the material of the skirt set into each of the apertures, each shoe having inclined abutments engaging the sloping walls of the pin bosses.

ADOLPH L. NELSON.